United States Patent
Liu et al.

(10) Patent No.: US 10,803,567 B2
(45) Date of Patent: Oct. 13, 2020

(54) IMAGE PROCESSING METHOD AND IMAGE PROCESSING DEVICE

(71) Applicant: REALTEK SEMICONDUCTOR CORPORATION, Hsinchu (TW)

(72) Inventors: Kai Liu, Taipei (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 74 days.

(21) Appl. No.: 16/247,945

(22) Filed: Jan. 15, 2019

(65) Prior Publication Data
US 2019/0220962 A1   Jul. 18, 2019

(30) Foreign Application Priority Data
Jan. 16, 2018 (TW) .............................. 107101516 A (51) Int. Cl.
*G06T 5/20* (2006.01)
*G06T 5/00* (2006.01)
*H04N 5/208* (2006.01)

(52) U.S. Cl.
CPC ................ *G06T 5/20* (2013.01); *G06T 5/002* (2013.01); *H04N 5/208* (2013.01); *G06T 2207/10024* (2013.01); *G06T 2207/20192* (2013.01)

(58) Field of Classification Search
CPC . G06T 5/20; G06T 5/002; G06T 2207/10024; G06T 2207/20192; H04N 5/208
See application file for complete search history.

(56) References Cited

U.S. PATENT DOCUMENTS

| | | | |
|---|---|---|---|
| 2011/0090351 A1* | 4/2011 | Cote | H04N 5/2355 348/208.1 |
| 2017/0185863 A1 | 6/2017 | Chandra et al. | |
| 2017/0301072 A1* | 10/2017 | Chandra | G06T 11/60 |

OTHER PUBLICATIONS

Taiwan Intellectual Property Office, Office Action from counterpart Taiwan application dated Sep. 17, 2018. English summary on p. 1.
Taiwan Intellectual Property Office, Office Action from counterpart Taiwan application dated Dec. 27, 2018. English summary on p. 1.

* cited by examiner

*Primary Examiner* — Neil R McLean
(74) *Attorney, Agent, or Firm* — WPAT, PC (57) ABSTRACT

This invention discloses an image processing method and an image processing device for filtering images. The image processing method includes the following steps: (A) generating a weight for each reference pixel, the image including multiple reference pixels and the magnitude of the weight being associated with a similarity between the reference pixel to which the weight corresponds and a target pixel; and (B) performing an infinite impulse response (IIR) filtering operation according to the weights, a pixel value of the target pixel, and the pixel values of the reference pixels to obtain an IIR-filtered value of the target pixel.

16 Claims, 10 Drawing Sheets

☐ Original pixel

| P(i-1,j+1) | P(i,j+1) | P(i+1,j+1) |
|---|---|---|
| P(i-1,j) | P(i,j) | P(i+1,j) |
| P(i-1,j-1) | P(i,j-1) | P(i+1,j-1) |

FIG. 9

IMAGE PROCESSING METHOD AND IMAGE PROCESSING DEVICE

BACKGROUND OF THE INVENTION

1. Field of the Invention

The present invention relates to image processing, and, more particularly, to an image processing method and an image processing device based on infinite impulse response (IIR).

2. Description of Related Art

Figure 1:
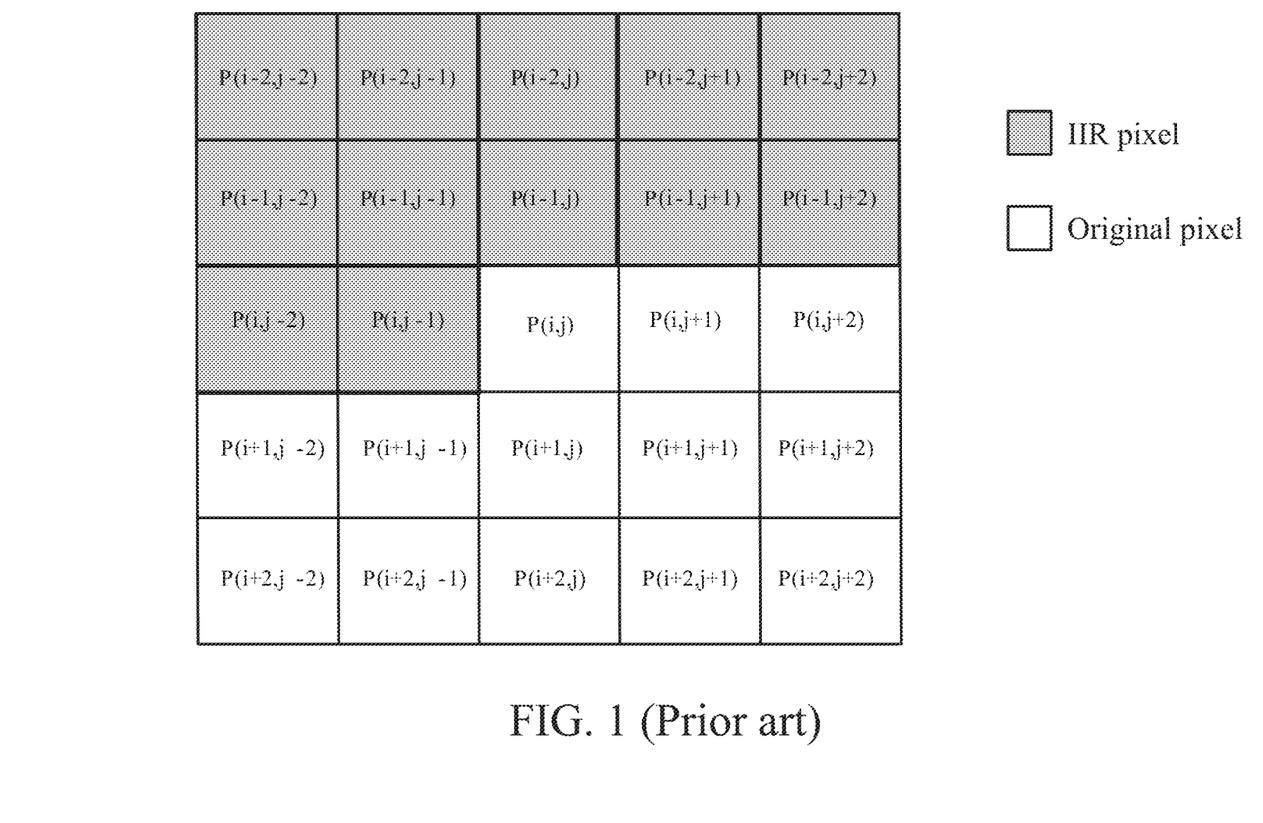
FIG. 1 shows a window used in image processing.

FIG. 1 shows a window used for image processing. The 5×5 window (containing 25 pixels) in the figure is used for image processing of the target pixel P(i, j) in the center, and the other pixels in the window are used as reference pixels. It is assumed that when the spatial-domain infinite impulse response (IIR) filtering operation is being performed, the image is processed according to the scanning order from the upper left to the lower right (Raster scan), and, therefore, the pixels with white background in the window are original pixels not yet IIR-filtered, and their pixel values are original pixel values $PV_{ORI}$), whereas the pixels with gray background are pixels that have been IIR-filtered (hereinafter abbreviated as IIR pixels), and their pixel values are IIR-filtered values $PV_{IIR}$. More specifically, the reference pixel P(i−2, j−2) is an IIR pixel (pixel value being $PV_{IIR}$(i−2, j−2)), the reference pixel P(i−2, j−1) is an IIR pixel (pixel value being $PV_{IIR}$(i−2, j−1)), . . . , the target pixel P(i,j) is an original pixel (pixel value being $PV_{ORI}$(i,j)), the reference pixel P(i,j+1) is an original pixel (pixel value being $PV_{ORI}$(i,j+1)), the pixel P(i, j+2) is an original pixel (pixel value being $PV_{ORI}$(i, j+2)), . . . .

The IIR filtering operation performs the filtering process on the target pixel by averaging the target pixel and the IIR pixels in the window. Taking FIG. 1 for example, the IIR filtering operation obtains the IIR-filtered value $PV_{IIR}$(i,j) of the target pixel P(i, j) according to equation (1), that is, the IIR filtering operation calculates the arithmetic mean of the pixel value $PV_{ORI}$(i,j) of the target pixel P(i,j) and the pixel values $PV_{IIR}$ of the 12 IIR pixels:

$$PV_{IIR}(i,j)=(PV_{IIR}(i-2,j-2)+PV_{IIR}(i-2,j-1)+PV_{IIR}(i-2,j)+PV_{IIR}(i-2,j+1)+PV_{IIR}(i-2,j+2)+PV_{IIR}(i-1,j-2)+PV_{IIR}(i-1,j-1)+PV_{IIR}(i-1,j)+PV_{IIR}(i-1,j+1)+PV_{IIR}(i-1,j+2)+PV_{IIR}(i,j-2)+PV_{IIR}(i,j-1)+PV_{ORI}(i,j))/13 \quad (1)$$

After the calculation of equation (1) is completed, the target pixel P(i, j) becomes an IIR pixel and also becomes a reference pixel in the subsequent IIR filtering process, in which the pixel P(i, j+1) in FIG. 1 is taken as the target pixel. Because the pixels referenced by the IIR filtering operation are the IIR pixels instead of the original pixels, and the IIR pixels are less susceptible to noises than the original pixels, the IIR filtering operation can use fewer reference pixels (meaning that fewer hardware resources are required) to effectively perform low-pass filtering to remove high frequency noises from the image. However, taking the scanning order from the upper left to the lower right as an example, because the IIR filtering operation takes only the pixels on the left, upper left, upper, and/or upper right of the target pixel as references but does not consider pixels in other directions, the pixel features on the left, upper left, upper, and/or upper right tends to diffuse towards other directions, which is referred to as image trailing that usually causes color distortion. When image trailing occurs at the edge of an image, the image edge becomes blurry. Therefore, it is an important issue in this technical field to effectively remove high-frequency noises while avoiding image trailing and color distortion.

SUMMARY OF THE INVENTION

In view of the issues of the prior art, an object of the present invention is to provide an image processing method and an image processing device, so as to make an improvement to the prior art.

An image processing method for filtering an image is provided. The image processing method includes steps of: (A) generating a first weight for each first reference pixel, wherein the image includes a plurality of first reference pixels, and a magnitude of the first weight is associated with a similarity between the first reference pixel to which the first weight corresponds and a target pixel; (B) calculating a first filtered value of the target pixel according to the first weights, a pixel value of the target pixel, and pixel values of the first reference pixels; (C) generating a second weight for each second reference pixel, wherein the image includes a plurality of second reference pixels, and a magnitude of the second weight is associated with a similarity between the second reference pixel to which the second weight corresponds and the target pixel; and (D) calculating a second filtered value of the target pixel according to the second weights, the first filtered value of the target pixel, and pixel values of the second reference pixels.

An image processing device for filtering an image is also provided. The image processing device includes a first weight calculation circuit, a first filtered value calculation circuit, a second weight calculation circuit, and a second filtered value calculation circuit. The first weight calculation circuit generates a first weight for each first reference pixel. The image includes a plurality of first reference pixels, and a magnitude of the first weight is associated with a similarity between the first reference pixel to which the first weight corresponds and a target pixel. The first filtered value calculation circuit calculates a first filtered value of the target pixel according to the first weights, a pixel value of the target pixel, and pixel values of the first reference pixels. The second weight calculation circuit generates a second weight for each second reference pixel. The image includes a plurality of second reference pixels, and a magnitude of the second weight is associated with a similarity between the second reference pixel to which the second weight corresponds and the target pixel. The second filtered value calculation circuit calculates a second filtered value of the target pixel according to the second weights, the first filtered value of the target pixel, and pixel values of the second reference pixels.

An image processing method for filtering an image is also provided. The image processing method includes steps of: (A) generating a weight for each reference pixel, wherein the image includes a plurality of reference pixels, and the magnitude of the weight is associated with a similarity between the reference pixel to which the weight corresponds and a target pixel; and (B) performing an infinite impulse response filtering operation according to the weights, a pixel value of the target pixel, and pixel values of the reference pixels to obtain an infinite impulse response filtered value of the target pixel.

The image processing method and the image processing device of the present invention implement an edge-preserving mechanism to suppress image trailing that usually occurs in the IIR filtering operation. Compared with the conventional technology, the present invention can protect the edge structure of the image while performing the filtering operation.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an image processing method and an image processing device. On account of that some or all elements of the image processing device could be known, the detail of such elements is omitted provided that such detail has little to do with the features of this disclosure and this omission nowhere dissatisfies the specification and enablement requirements. A person having ordinary skill in the art can choose components or steps equivalent to those described in this specification to carry out the present invention, which means that the scope of this invention is not limited to the embodiments in the specification.

Figure 2:
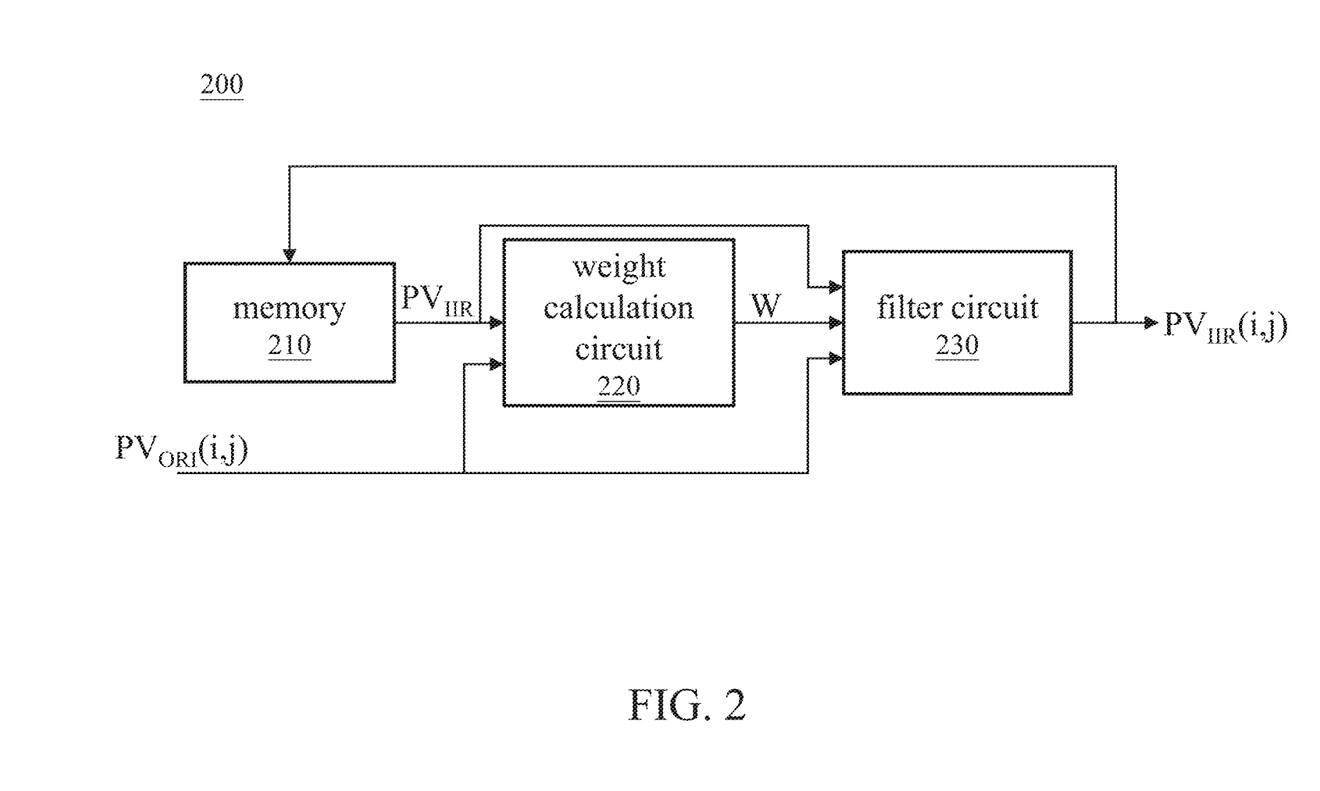
FIG. 2 shows a functional block diagram of an image processing device according to an embodiment of the present invention.
Figure 3A:
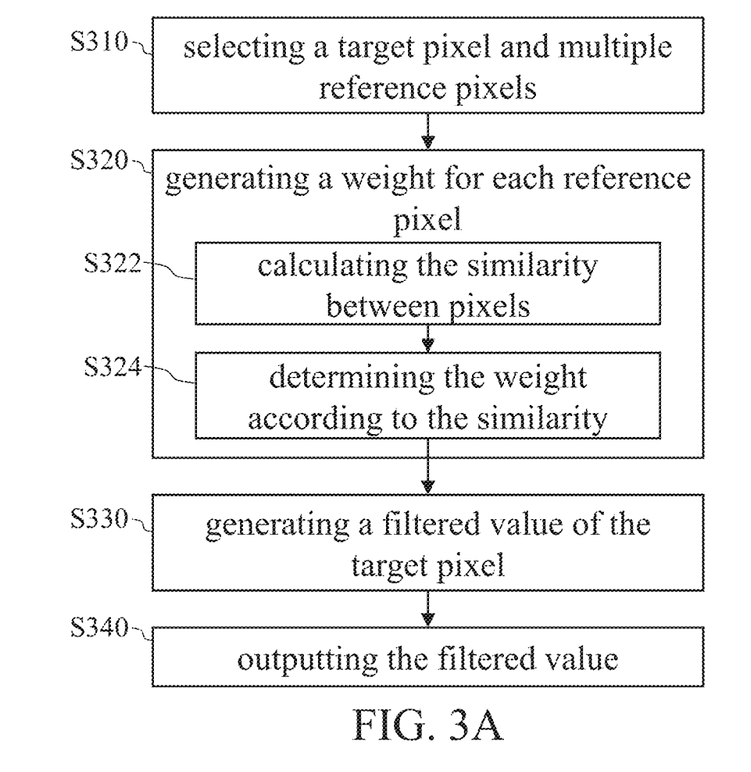
FIGS. 3A-3B show the flowcharts of the image processing method according to an embodiment of the present invention.
Figure 3B:
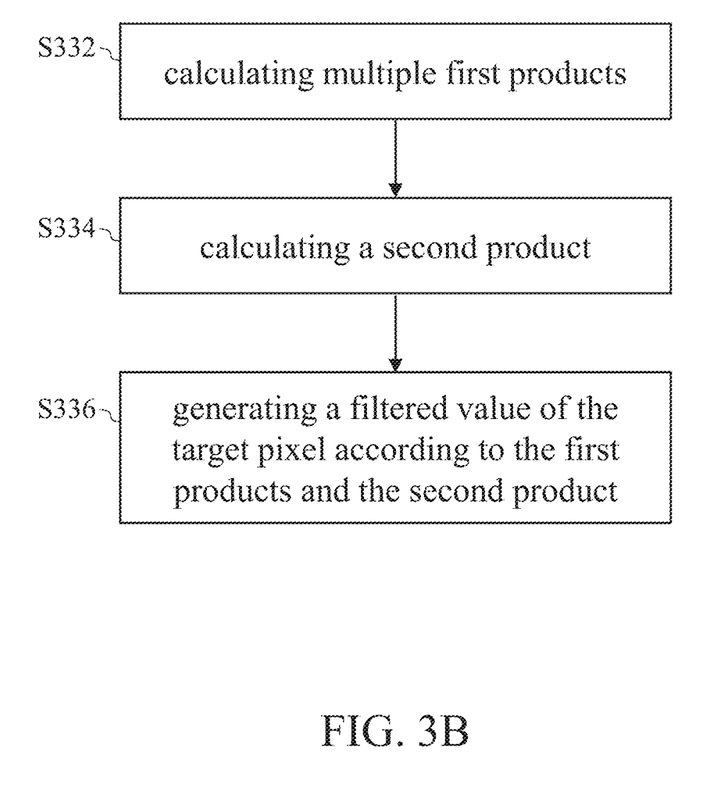
Figure 4:
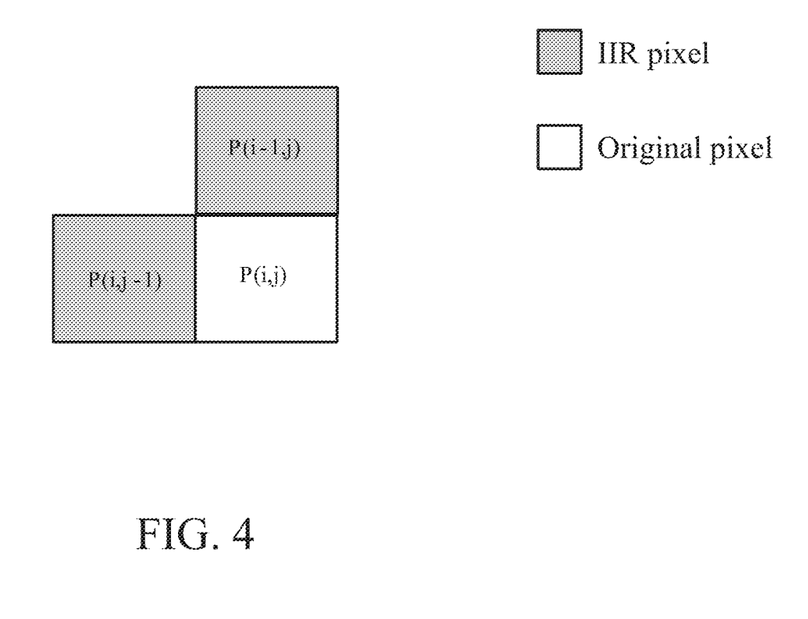
FIG. 4 shows another window used in image processing.

FIG. 2 is a functional block diagram of an image processing device according to an embodiment of the present invention, and FIGS. 3A-3B show the flowcharts of the image processing method corresponding to FIG. 2. The image processing device 200 includes a memory 210, a weight calculation circuit 220, and a filter circuit 230. When performing image processing, the image processing device 200 first selects a target pixel P(i, j) and takes multiple pixels neighboring the target pixel P(i, j) as the reference pixels (step S310). The reference pixels are IIR pixels. For example, in FIG. 1, the reference pixels may include the 12 IIR pixels, and, in this case, the memory 210 needs to store at least the 12 IIR pixels. FIG. 4 shows another embodiment of a window used by the image processing device 200. In this example, the reference pixels include only two IIR pixels, and, in this case, the memory 210 needs to store at least the two IIR pixels. Compared with the embodiment of FIG. 1, the embodiment of FIG. 4 stores fewer pixel values (at least ten reference pixels fewer).

Figure 5:
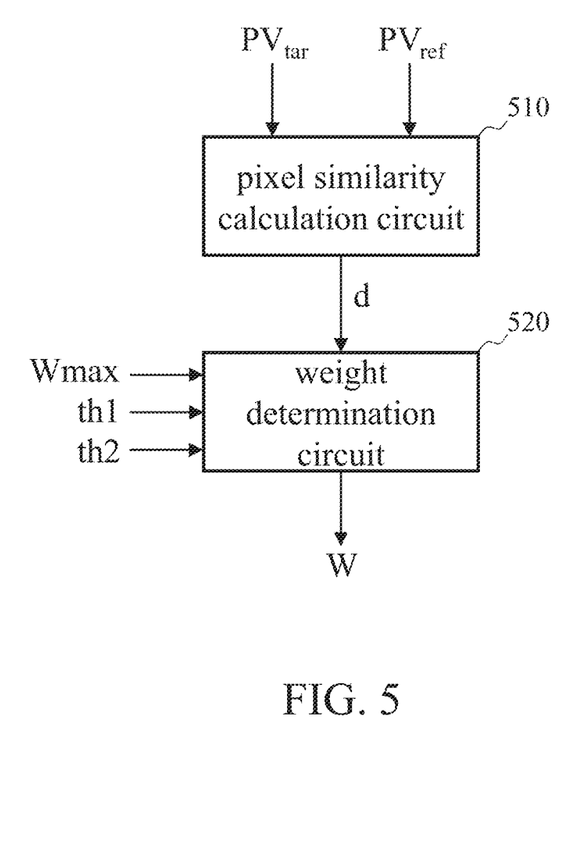
FIG. 5 shows a functional block diagram of the weight calculation circuit according to one embodiment of this invention.

Next, the weight calculation circuit 220 generates a weight for each reference pixel (step S320). More specifically, the weight calculation circuit 220 accesses the memory 210 for the reference pixels and determines a weight W for each reference pixel according to the similarity between each reference pixel and the target pixel; that is, the magnitude of the weight W is related to the similarity between the two pixels—the reference pixel and the target pixel. FIG. 5 is a functional block diagram of the weight calculation circuit 220 according to one embodiment of this invention. First, the pixel similarity calculation circuit 510 calculates the similarity between each reference pixel and the target pixel in accordance with the pixel value $PV_{tar}$ of the target pixel and the pixel value $PV_{ref}$ of each reference pixel to thereby obtain a difference d (step S322). For example, the pixel similarity calculation circuit 510 calculates the absolute difference $d=|PV_{tar}-PV_{ref}|$ between the target pixel and the reference pixel; the greater the absolute difference d, the smaller the similarity between the target pixel and the reference pixel. In this embodiment, the pixel value $PV_{tar}$ is the original pixel value $PV_{ORI}(i,j)$ of the target pixel P(i,j), and the pixel value $PV_{ref}$ is the IIR-filtered value $PV_{IIR}$ of the reference pixel.

Figure 6A:
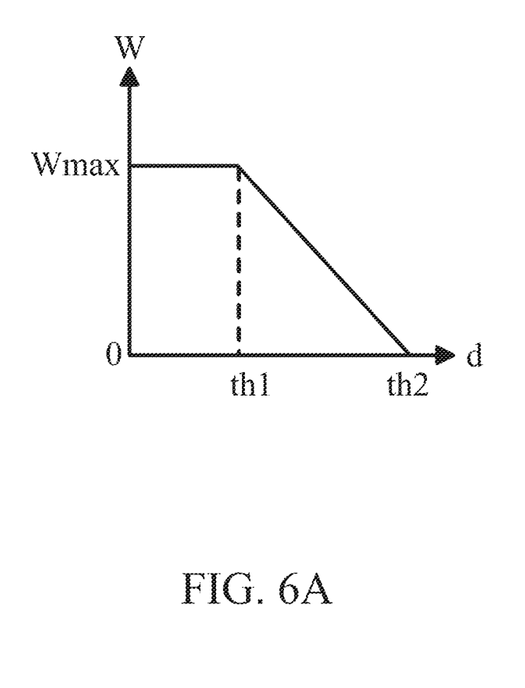
FIGS. 6A-6B show examples of the relationship between the weight and the pixel difference.
Figure 6B:
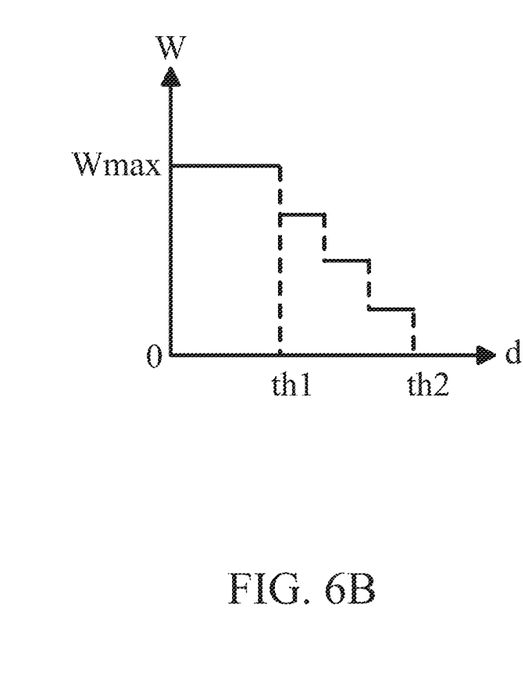

Next, the weight determination circuit 520 determines a weight W for each reference pixel according to the difference d (equivalent to the similarity between the pixels), the greatest weight Wmax, a first threshold th1, and a second threshold th2 (step S324). FIGS. 6A and 6B are examples of the relationship between the weight W and the difference d. When the difference d is smaller than the first threshold th1, implying that the similarity between the target pixel and the reference pixel is high, the weight determination circuit 520 assigns the greatest weight Wmax to the reference pixel; when the difference d is between the first threshold th1 and the second threshold th2, the weight W decreases as the difference d increases; when the difference d is greater than the second threshold th2, implying that the similarity between the target pixel and the reference pixel is low, the weight determination circuit 520 assigns a weight W of zero to the reference pixel. For the simplicity of hardware implementation, the weight determination circuit 520 can automatically divide the range between the first threshold th1 and the second threshold th2 into q equal parts (q is an integer greater than 1, in the example of FIG. 6B q=3), to thereby make the weight W change in a stepwise manner. Compared to the implementation of FIG. 6A, the circuit for FIG. 6B can omit the divider that calculates the slope between the thresholds th1 and th2 of FIG. 6A.

After the weights of all reference pixels are obtained, the filter circuit 230 calculates a weighted average of the target pixel and the reference pixels based on equation (2) to thereby generate an IIR-filtered value of the target pixel (step S330).

$$PV_{IIR}(i,j)=((W_{SUM}-W_{NBR})\times PV_{ORI}(i,j)+\Sigma(W\times PV_{IIR}))/W_{SUM} \quad (2)$$

As shown in FIG. 3B, step S330 may be broken up into the following sub-steps S332 to S336: calculating multiple first products (W×PV$_{IIR}$) (step S332), calculating a second product ((W$_{SUM}$−W$_{NBR}$)×PV$_{ORI}$(i, j)) (step S334), and generating a filtered value of the target pixel according to the first products and the second product (step S336). In detail, step S336 divides the sum of the second product and the first products by a user-defined weight sum W$_{SUM}$ to generate a filtered value of the target pixel. W$_{NBR}$ is the sum of the weights of all reference pixels, the first product (W×PV$_{IIR}$) is the product of the weight W of a certain reference pixel and the IIR-filtered value of same reference pixel, and Σ(W×PV$_{IIR}$) is the sum of the first products of all reference pixels. Taking FIG. 4 as an example, equation (2) gives:

$$PV_{IIR}(i,j)=((W_{SUM}-W_{NBR})\times PV_{ORI}(i,j)+W(i-1,j)\times PV_{IIR}(i-1,j)+Wi,j-1\times PVIIRi,j-1/W \text{ SUM} \quad (3)$$

where $$W_{NBR}=W(i-1,j)W(i,j-1) \quad (4)$$

The weight sum W$_{SUM}$ can be designed as W$_{SUM}$=(n−1)× Wmax≈Wmax, where n is the number of pixels in the window. That is, when the similarities between the target pixel and all reference pixels in the window and are extremely high (e.g., the window is in a flat region in the image in which the pixel values do not change much), the weight of the target pixel (W$_{SUM}$−W$_{NBR}$=W$_{SUM}$−(n−1)× Wmax≈Wmax) is equivalent to the weight of any reference pixel. In one embodiment, W$_{SUM}$ can be designed to be a power of two, so that the division operation of equation (2) can be realized by shifting the binary number without using any divider.

When the target pixel is on an edge of the image, in the window, the reference pixels that are also on the edge (i.e., the reference pixels with high similarity to the target pixel) have higher weights W, whereas the other reference pixels not on an edge (i.e., the reference pixels with low similarity to the target pixel) have lower weights W. As a result, the edge features can be preserved in the filtered image, and, thus, the weight can be regarded as an edge-preserving weight. Specifically, the mechanism for the weight calculation circuit 220 to generate the weight W is related to the edges of the image. This mechanism enables the filtering processing of the image processing device 200 to have edge sensing capability; therefore, the image processing device 200 can effectively suppress image trailing of the IIR filtering operation to prevent color distortion and blurry edges.

After generating the IIR-filtered value PV$_{IIR}$ of the target pixel, the image processing device 200 outputs it to a subsequent circuit (not shown) (i.e., a circuit that follows the image processing device 200) (step S340) and also stores it in the memory 210 for the use of the subsequent IIR filtering procedure.

Figure 7:
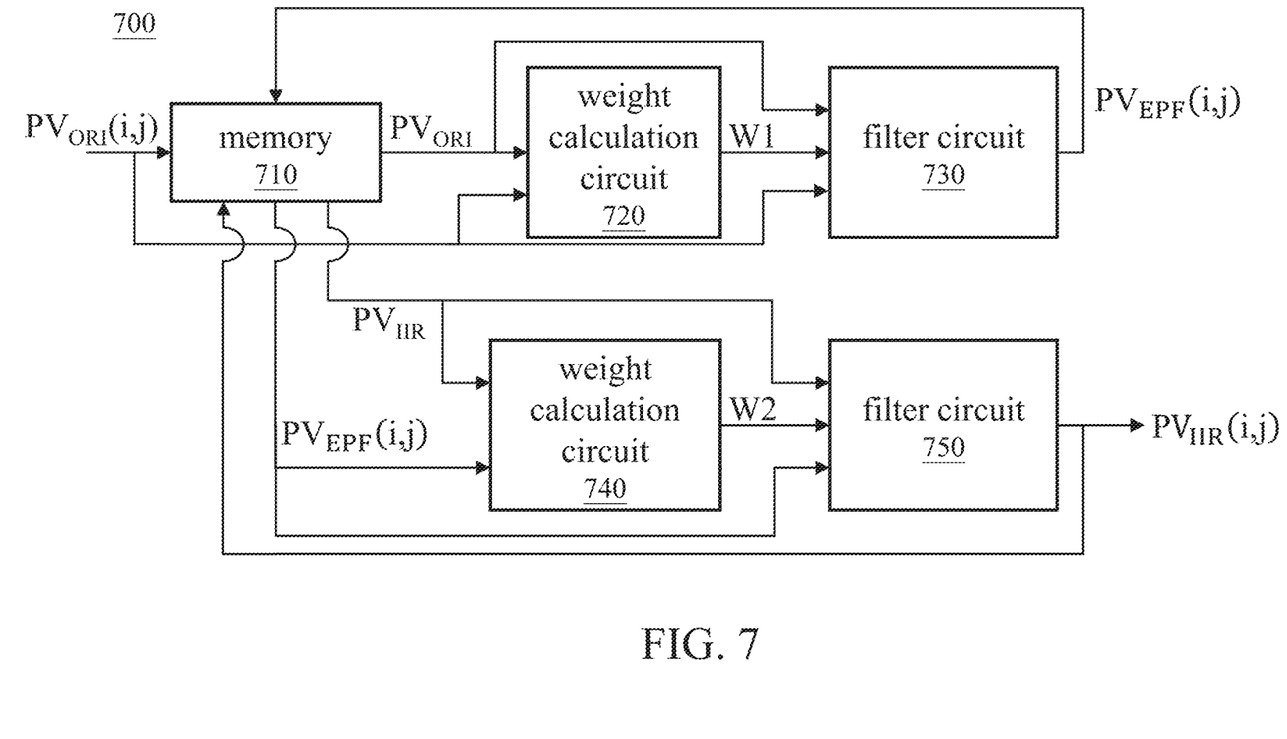
FIG. 7 shows a functional block diagram of an image processing device according to another embodiment of the present invention.
Figure 8:
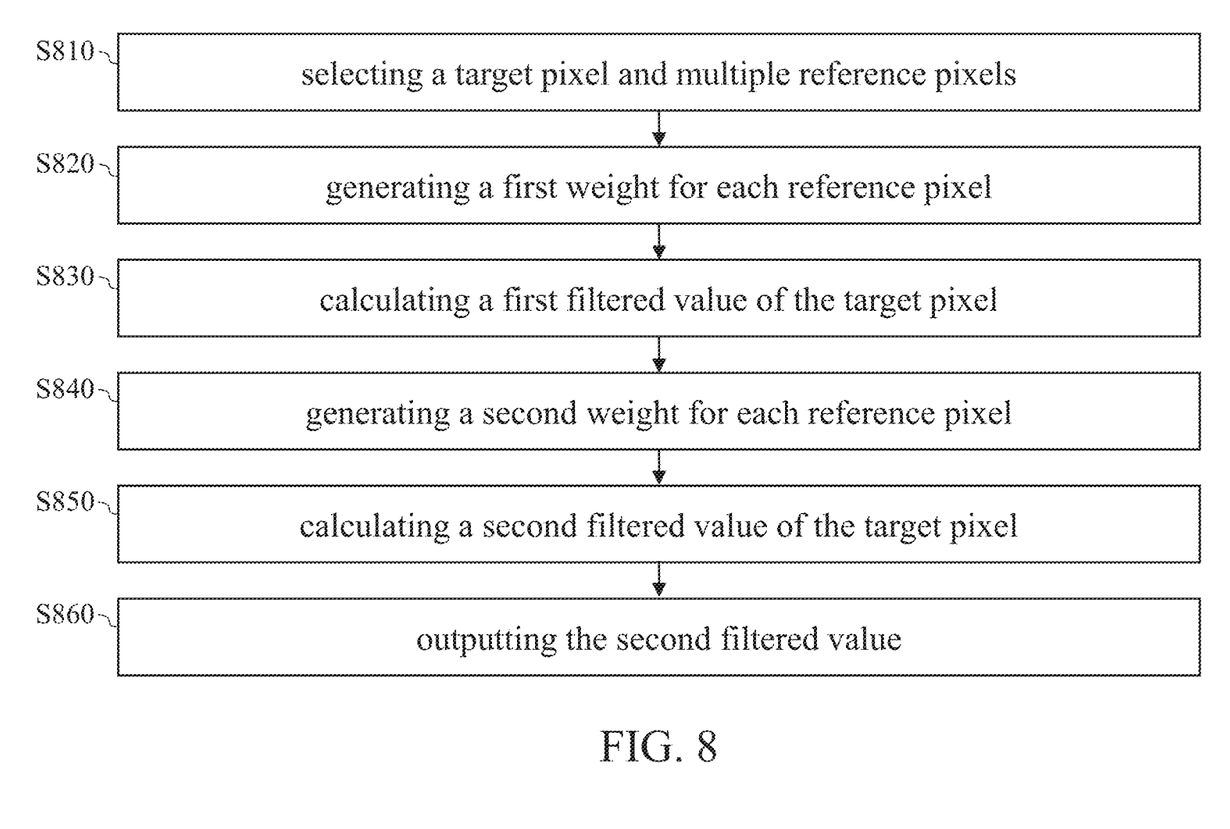
FIG. 8 shows the flowchart of the image processing method according to another embodiment of the present invention.

FIG. 7 is a functional block diagram of the image processing device according to another embodiment of the present invention, and FIG. 8 is a flowchart of the image processing method corresponding to FIG. 7. The image processing device 700 includes a memory 710, weight calculation circuits 720 and 740, and filter circuits 730 and 750. The memory 710 stores reference pixels. When performing image processing, the image processing device 700 first selects a target pixel P(i, j) and then takes multiple pixels neighboring the target pixel P(i, j) as reference pixels (step S810). Then, the weight calculation circuit 720 generates a first weight W1 for each reference pixel according to the original pixel values PV$_{ORI}$ of each reference pixel and the target pixel (step S820); that is, the first weight W1 is related to the similarity between the two pixels—the target pixel and the reference pixel. Similarly, a functional block diagram of the weight calculation circuit 720 according to an embodiment of this invention is shown in FIG. 5, and step S820 includes two sub-steps S322 and S324. In step S820, the pixel value PV$_{tar}$ and the pixel value PV$_{ref}$ that are inputted to the pixel similarity calculation circuit 510 are the original pixel value PV$_{ORI}$ of the target pixel P(i, j) and the original pixel value PV$_{ORI}$ of the reference pixel, respectively.

Next, the filter circuit 730 calculates a weighted average of the target pixel and the reference pixels according to equation (5) to generate an edge-preserved low-pass filtered value PV$_{EPF}$(i,j) of the target pixel (step S830).

$$PV_{EPF}(i,j)=((W_{SUM}-W_{NBR})\times PV_{ORI}(i,j)+\Sigma(W1\times PV_{ORI}))/W_{SUM} \quad (5)$$

Figure 9:
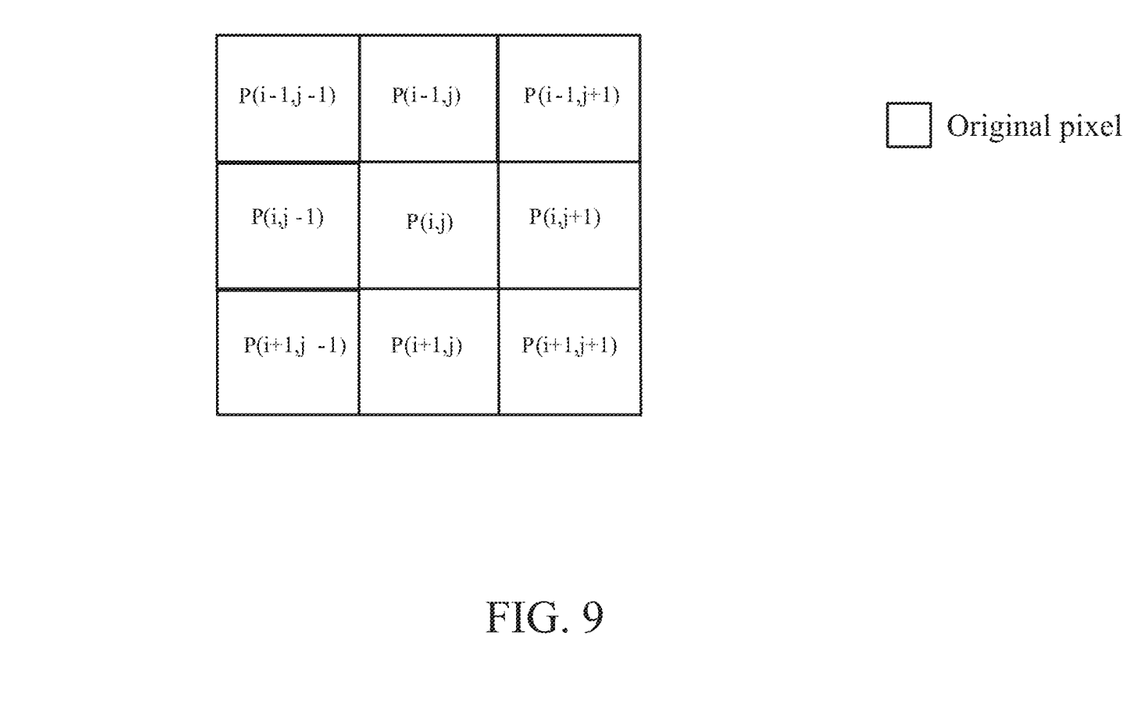
FIG. 9 shows another window used in image processing.

In equation (5), the sum of the second product ((W$_{SUM}$−W$_{NBR}$)×PV$_{ORI}$ (i) and multiple first products (W1×PV$_{ORI}$) is divided by the user-defined weight sum W$_{sum}$, where W1$_{NBR}$ is the sum of the first weights W1 of all reference pixels, the first product (W1×PV$_{ORI}$) is the product of the first weight W1 of a certain reference pixel and the original pixel value of same reference pixel, and Σ(W1×PV$_{ORI}$) is the sum of the first products of all the reference pixels. For example, taking the window of FIG. 9 as an example, equation (5) gives:

$$PV_{EPF}(i,j)((W_{SUM}-W_{NBR})\times PV_{ORI}(i,j)+W1(i-1,j-1)\times PV_{ORI}(i-1,j-1)+W1i-1,j\times PVORIi-1,j+W1i-1,j+1\times PVORIi-1,j+1+W1i,j-1\times PVORIi,j-1+W1i,j+1\times PVORIi,j+1\pm W1i+1,j\times PVORIi+1,j+W1i+1,j+1\times PVORIi+1,j+1/\text{WSUM} \quad (6)$$

where $$W1_{NBR}=W1(i-1,j-1)+W1(i-1,j)W1(i-1,j+1)+W1(i,j-1)+W1(i,j+1)+W1(i+1,j-1)+W1(i+1,j)W1(i+1,j+1) \quad (7)$$

In fact, steps S820-S830 are a finite impulse response (FIR) filtering process with an edge-preserving mechanism. The edge-preserved low-pass filtered value PV$_{EPF}$(i,j) of the target pixel is stored in memory 710 so that it can be used in the subsequent filtering procedures.

Next, in steps S840 and S850, the weight calculation circuit 740 and the filter circuit 750 further perform the IIR filtering operation on the edge-preserved low-pass filtered value PV$_{EPF}$(i, j) to generate the IIR-filtered value PV$_{IIR}$(i, j) of the target pixel. That is, steps S840 and S850 are substantially the same as steps S320 and S330, except that the weight calculation circuit 740 and the filter circuit 750 use the edge-preserved low-pass filtered value PV$_{EPF}$(i,j) of the target pixel, instead of the original pixel value PV$_{ORI}$(i, j). Similarly, the functional block diagram of the weight calculation circuit 740 according to an embodiment of this invention is shown in FIG. 5. In step S840, the pixel value PV$_{tar}$ and the pixel value PV$_{ref}$ inputted to the pixel similarity calculation circuit 510 are respectively the edge-preserved low-pass filtered value PV$_{EPF}$(i,j) of the target pixel and the IIR-filtered value PV$_{IIR}$ of the reference pixel. After a second weight W2 of each reference pixel (similarly, the magnitude of the weight W2 is related to the similarity between the two pixels—the target pixel and the reference pixel) is obtained, the filter circuit 750 calculates the IIR-filtered value of the target pixel according to equation (8).

$$PV_{IIR}(i,j)=((W_{SUM}-W2_{NBR})\times PV_{EPF}(i,j)+\Sigma(W2\times PV_{IIR}))/W_{SUM} \quad (8)$$

Equation (8) is similar to equation (2), and the discussion for equation (8) is thus omitted for brevity. In equation (8), $W2_{NBR}$ is the sum of the second weights W2 of all reference pixels. Taking FIG. 4 as an example, $$W2_{NBR}=W2(i-1,j)+W2(i,j-1) \quad (9)$$

The embodiment of FIGS. 7 and 8 performs two filtering processes on the image—the first filtering process is performed by the weight calculation circuit 720 and the filter circuit 730 (corresponding to steps S820 to S830), and the second filtering process is performed by the weight calculation circuit 740 and the filter circuit 750 (corresponding to steps S840 to S850). The mechanism of the second filtering process is similar to that of the filtering process of the previous embodiment (corresponding to FIG. 2 and FIG. 3), and the purpose of the first filtering process is to further remove high frequency noises of the image to thereby make the image clearer. Since both of the two filtering processes in the embodiment corresponding to FIG. 7 and FIG. 8 implement the edge-preserving mechanism (i.e., the first weight and the second weight are edge-preserving weights), the filtered result can effectively suppress image trailing, thus, preventing color distortion and blurry edge. In the embodiment corresponding to FIG. 7 and FIG. 8, the reference pixels in the first filtering process include the reference pixels in the second filtering process. For example, as shown in FIGS. 9 and 4, the two reference pixels (P(i−1, j) and P(i, j−1)) in FIG. 4 are part of the eight reference pixels in FIG. 9.

By using two thresholds in the determination of the allowable range for pixel similarity, this invention can easily and effectively achieve a sophisticated trade-off between the degree of image trailing suppression and the degree of noise reduction. Specifically, when the first and second thresholds are both decreased, a reference pixel must be more similar to the target pixel to be given the highest weight Wmax, which helps to suppress image trailing (i.e., enhancing edge preservation of images); when, on the other hand, the first and second thresholds are both increased, a reference pixel has a greater chance of being given the highest weight Wmax, which helps to reduce noises (i.e., making the image clearer). By increasing the difference between the first and second thresholds, the filtering process can have better and more adaptive operation flexibility between image trailing suppression and noise reduction.

The weight calculation circuit and the filter circuit of the present invention can be formed by the combination of an adder, a subtractor, a multiplier, a divider, a comparator, a multiplexer, a logic circuit, and the like. The weight calculation circuit 720 and the weight calculation circuit 740 of FIG. 7 may be the same set of hardware circuit or separate hardware circuits. The filter circuit 730 and the filter circuit 750 may be the same set of hardware circuit or separate hardware circuits. The image processing device and the image processing method of the present invention can be applied to images in various color formats (e.g., RGB channel, YUV channel, grayscale image, etc.), and each channel of the color format is independently processed, so the edge-preserving mechanism (i.e., the implementation of edge-preserving weights) can avoid color distortion.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing method for filtering an image including a plurality of first reference pixels, comprising steps of:
    (A) generating a first weight for each of the first reference pixels, and a magnitude of the first weight is associated with a similarity between the first reference pixel that the first weight corresponds to and a target pixel;
    (B) calculating a first filtered value of the target pixel according to the first weights, a pixel value of the target pixel, and pixel values of the first reference pixels;
    (C) generating a second weight for each second reference pixel, wherein the image comprises a plurality of second reference pixels, and a magnitude of the second weight is associated with a similarity between the second reference pixel to which the second weight corresponds and the target pixel; and
    (D) calculating a second filtered value of the target pixel according to the second weights, the first filtered value of the target pixel, and pixel values of the second reference pixels.

2. The image processing method of claim 1, wherein step (B) comprises steps of:
    calculating a plurality of first products, wherein each first product is a product of a pixel value of the first reference pixel and the first weight corresponding to the first reference pixel;
    calculating a second product, wherein the second product is a product of the pixel value of the target pixel and a difference between a predetermined weight and a sum of the first weights; and
    obtaining the first filtered value of the target pixel according to the first products and the second product; and
step (D) comprises steps of:
    calculating a plurality of third products, wherein the third products are products of pixel values of the second reference pixels and the corresponding second weight;
    calculating a fourth product, wherein the fourth product is a product of the first filtered value of the target pixel and a difference between the predetermined weight and a sum of the second weights; and
    obtaining the second filtered value of the target pixel according to the third products and the fourth product.

3. The image processing method of claim 1, wherein the pixel values of the first reference pixels are original pixel values of the first reference pixels, and the pixel values of the second reference pixels are the second filtered values of the second reference pixels.

4. The image processing method of claim 1, wherein step (A) and step (B) utilize original pixel values of the target pixel and the first reference pixels to perform calculation, and step (C) and step (D) utilize the second filtered values of the second reference pixels and the first filtered value of the target pixel to perform calculation.

5. The image processing method of claim 4, wherein step (A) or step (C) comprises:

calculating an absolute difference between the target pixel and the first reference pixel or the second reference pixel; and determining the first weight or the second weight according to the absolute difference, a first threshold, and a second threshold.

6. The image processing method of claim 1, wherein the second reference pixels are part of the first reference pixels.

7. An image processing device for filtering an image including a plurality of first reference pixels, comprising:

a first weight calculation circuit that generates a first weight for each of the first reference pixels, and a magnitude of the first weight is associated with a similarity between the first reference pixel that the first weight corresponds to and a target pixel;

a first filtered value calculation circuit that calculates a first filtered value of the target pixel according to the first weights, a pixel value of the target pixel, and pixel values of the first reference pixels;

a second weight calculation circuit that generates a second weight for each second reference pixel, wherein the image comprises a plurality of second reference pixels, and a magnitude of the second weight is associated with a similarity between the second reference pixel to which the second weight corresponds and the target pixel; and a second filtered value calculation circuit that calculates a second filtered value of the target pixel according to the second weights, the first filtered value of the target pixel, and pixel values of the second reference pixels.

8. The image processing device of claim 7, wherein the pixel values of the first reference pixels are original pixel values of the first reference pixels, and the pixel values of the second reference pixels are the second filtered values of the second reference pixels.

9. The image processing device of claim 7, wherein the first weight calculation circuit and the first filtered value calculation circuit utilize original pixel values of the target pixel and the first reference pixels to perform calculation, and the second weight calculation circuit and the second filtered value calculation circuit utilize the second filtered values of the second reference pixels and the first filtered value of the target pixel to perform calculation.

10. The image processing device of claim 9, wherein the first weight calculation circuit or the second weight calculation circuit comprises:

a pixel similarity calculation circuit configured to calculate an absolute difference between the target pixel and the first reference pixel or the second reference pixel; and a weight determination circuit coupled to the pixel similarity calculation circuit and configured to determine the first weight or the second weight according to the absolute difference, a first threshold, and a second threshold.

11. The image processing device of claim 7, wherein the second reference pixels are part of the first reference pixels.

12. An image processing method for filtering an image, comprising steps of:

(A) generating a weight for each reference pixel, wherein the image comprises a plurality of reference pixels, and the magnitude of the weight is associated with a similarity between the reference pixel to which the weight corresponds and a target pixel; and (B) performing an infinite impulse response filtering operation according to at least the weights a predetermined weight, a pixel value of the target pixel, and pixel values of the reference pixels to obtain an infinite impulse response filtered value of the target pixel.

13. The image processing method of claim 12, wherein step (B) comprises steps of:

calculating a plurality of first products, wherein each first product is a product of a pixel value of the reference pixel and the weight corresponding to the reference pixel;

calculating a second product, wherein the second product is a product of the pixel value of the target pixel and a difference between the predetermined weight and a sum of the weights; and obtaining the infinite impulse response filtered value of the target pixel according to the first products and the second product.

14. The image processing method of claim 12, wherein the pixel values of the reference pixels are the infinite impulse response filtered values of the reference pixels.

15. The image processing method of claim 12, wherein step (A) and step (B) utilize the infinite impulse response filtered values of the reference pixels and an original pixel value of the target pixel to perform calculation.

16. The image processing method of claim 15, wherein step (A) comprises:

calculating an absolute difference between the reference pixel and the target pixel; and determining the weight according to the absolute difference, a first threshold, and a second threshold.

* * * * *